United States Patent

[11] 3,627,392

[72] Inventor Finley Ruppersburg
Indianapolis, Ind.
[21] Appl. No. 517,380
[22] Filed Dec. 29, 1965
[45] Patented Dec. 14, 1971
[73] Assignee RCA Corporation

[54] STEREOPHONIC SOUND-REPRODUCING APPARATUS
11 Claims, 8 Drawing Figs.

[52] U.S. Cl. .......... 312/8, 274/2, 274/1 G
[51] Int. Cl. .......... A47b 81/06
[50] Field of Search .......... 179/1 E, 1 AT; 312/8; 274/1 G, 2; 181/31 B

[56] References Cited

UNITED STATES PATENTS

| | | | |
|---|---|---|---|
| 3,167,314 | 1/1965 | Bentsen | 312/8 |
| 3,169,772 | 2/1965 | Bentsen | 312/8 |

*Primary Examiner*—James C. Mitchell
*Attorney*—Eugene M. Whitacre

CLAIM: 1. A portable carrying case for sound-reproducing apparatus comprising:

a normally upright frame having a pair of spaced side members defining an opening therebetween;

tray means for receiving a record reproducing mechanism mounted between said side members for movement between a substantially horizontal operating position and a substantially vertical storage position, said tray means in its storage position providing a closed back covering the frame opening defined by said vertical side members;

a pair of enclosures for housing loudspeaker apparatus; and means for mounting said enclosures on said side members for movement between an operating position wherein said enclosures face forwardly of said sound-reproducing apparatus in flanking relation to said tray means, and a storage position wherein said enclosures close toward one another to overlay the record reproducing mechanism in said tray means, said enclosures in the storage position providing a front covering of the opening defined by said frame side member, whereby in the storage position of said apparatus, the bottom surface of said tray means and the rear surfaces of said loudspeaker enclosures cooperate to enclose said record-reproducing mechanism, and in the operating position of said apparatus the record-reproducing mechanism is exposed to facilitate easy record loading and operation.

INVENTOR.
FINLEY RUPPERSBURG
BY Eugene M. Whitacre
Attorney

INVENTOR
FINLEY RUPPERSBURG
BY Eugene M. Whitacre
Attorney

INVENTOR.
FINLEY RUPPERSBURG
BY Eugene M. Whitacre
Attorney

STEREOPHONIC SOUND-REPRODUCING APPARATUS

This invention relates to portable stereophonic phonograph apparatus of the type normally used for home entertainment.

In portable stereophonic sound reproducing apparatus such as phonographs, tape recorders and the like, it is desirable to enclose the equipment in a compact package for easy portability and storage. One form of portable phonograph which is presently on the market includes a record player which is pivotally movable between a horizontal record-playing position and a generally vertical storage position. These phonographs include a pair of loudspeaker enclosures which are pivotally mounted at either end of the phonograph casing to be movable from storage positions at the ends of the casing to forwardly facing positions at either side of the record player. Although such phonographs are attractively packaged for portability, a portion of the record player is located inside the phonograph housing when in the record-playing position making it difficult to load records onto the record player.

It is an object of this invention to provide an improved portable carrying case for housing sound-reproducing equipment such as a phonograph, tape recorder or the like.

It is another object of this invention to provide an improved portable carrying case for housing sound-reproducing apparatus which is of economical construction.

It is a further object of this invention to provide an improved portable carrying case for housing phonograph sound-reproducing apparatus which includes a record-reproducing mechanism mounted for pivotal movement between a horizontal playing or reproducing position and a vertical storage position, which mechanism, in the reproducing position is easily accessible for loading of the sound records.

In accordance with a preferred embodiment of the invention, the portable carrying case for the sound-reproducing apparatus comprises a tray to receive a record-reproducing mechanism, and a pair of enclosures mounted on a supporting frame for receiving loudspeaker apparatus. The supporting frame comprises a pedestal or base, and a pair of generally parallel upstanding side members. The tray for the record-reproducing mechanism is pivotally mounted between the side members for movement between a generally horizontal operating position and a generally vertical storage position. The enclosures are respectively mounted on the side members for pivotal movement between an operative position wherein the enclosures extend in flanking relationship to the record-reproducing mechanism contained in the tray member so that sound will be directed forwardly, and a closed position covering the record-reproducing mechanism. Thus in the closed or storage position the rear of the tray forms one side of the phonograph housing and the rear of the speaker enclosures forms the opposite side of the housing. In the playing position the tray member is in a horizontal position fully exposing the record-reproducing mechanism, thereby to facilitate easy record loading and operation.

In addition to providing operational advantages due to the accessibility of the record-reproducing mechanism, apparatus embodying the invention enjoys advantages with respect to economy of construction, since the casing is comprised almost entirely of structure necessarily a part of apparatus which it houses, while at the same time enhancing the appearance of the apparatus in both the storage and operating positions.

The novel features which are considered to be characteristic of this invention are set forth with particularity in the appended claims. The invention itself, however, both as to its organization and method of operation will best be understood from the following description when considered in connection with the accompanying drawings in which:

In referring to the drawings, like elements and parts are designated by like reference characters throughout the Figures.

Figures 1, 2, 3:
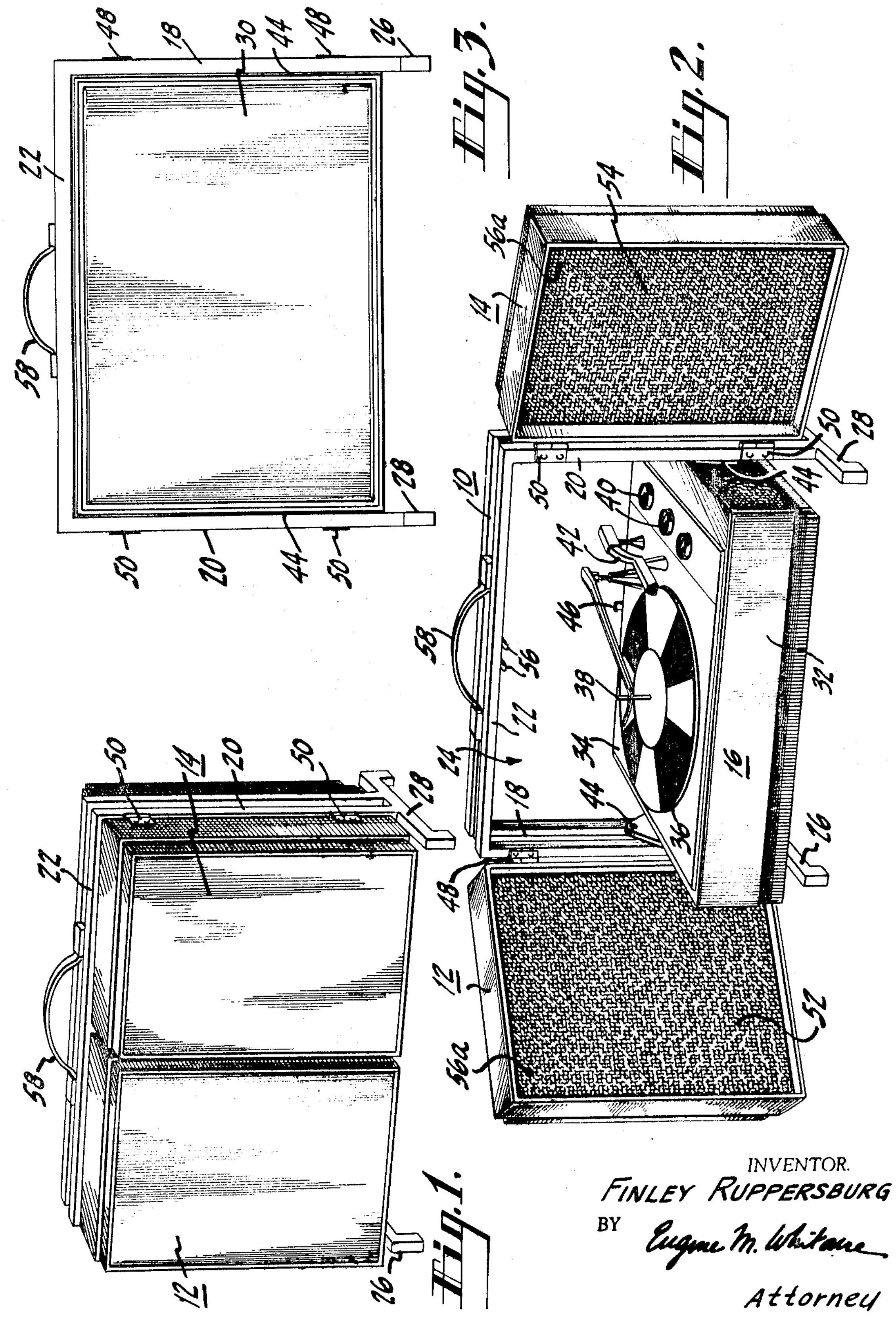
FIG. 1 is a front perspective view of a portable phonograph embodying the invention in its closed position.
FIG. 2 is a front perspective view of the portable phonograph of FIG. 1 shown in its operating position.
FIG. 3 is a rear elevation view of FIG. 1.

FIG. 2 is a perspective view illustrating a portable phonograph including a typical stereo-record player mechanism, loudspeakers and associated amplifier equipment. The phonograph includes a support frame 10, a pair of box-shaped loudspeaker enclosures 12 and 14 and a tray 16 for the amplifier, not shown, and record player mechanism.

As shown in FIG. 2, the support frame 10 is essentially rectangular in shape and characterized by a pair of vertical side frame members 18 and 20 spaced apart at the top by a horizontal frame member 22. A pair of feet or pedestals 26 and 28 are provided on the bottom ends of respective sidewalls 18 and 20.

The tray 16 has a bottom wall 30 (FIG. 3) together with four sidewalls 32 to define a rectangular space within which a stereophonic record player mechanism and associated amplifiers are housed. In the present example the record player mechanism may include a mounting board 34, turntable 36, spindle 38, controls 40 and a pickup arm 42. A stereophonic amplifier and remaining player mechanism (not shown) may be mounted beneath the mounting board 34.

The tray 16 carrying the record player mechanism and associated apparatus is pivotally joined to the inside surfaces of opposing side frame members 18 and 20 by means of bracket elements 44. Thus the support frame 10 serves as an upright stand in which the tray 16 may be pivoted between an operating position (FIG. 2) in which the tray 16 extends through the frame opening 24 in a horizontal plane, and a closed or storage position (FIGS. 1 and 3) in which the tray 16 is oriented in a vertical plane to cover the rear exposure of the frame opening 24. A latching member 46 may be provided to lock the tray 16 in its storage position. Also, suitable stop members (not shown) may be provided to ensure proper horizontal positioning of the tray 16 in its operating position.

The pair of loudspeaker enclosures 12 and 14 are pivotally mounted on the respective sidewall members 18 and 20 by means of hinges 48 and 50. The enclosures 12 and 14 each provide a housing for one or more loudspeakers (not shown) which are covered by suitable grill cloths 52 and 54. Electrical connecting cords (not shown) may be provided to make the necessary electrical connections between the amplifiers contained in the tray 16 and the loudspeakers. The hinges 48 and 50 may be such as to allow for easy detachment of the loudspeaker enclosures, thereby permitting placement and operation of the speakers at various locations spaced from the record player.

As shown in FIG. 2, when the tray 16 is in its horizontal operating position the enclosures 12 and 14 will be laterally disposed in flanking relationship to the tray 16, with their front or grill cloth covered surfaces 52 and 54 facing forward. The enclosures 12 and 14 are designed to provide a total front surface area approximately equal to or larger than that defined by the frame 10. Thus, with the tray 16 in its closed position, the enclosures 12 and 14 may be pivoted in toward the tray 16 to a closed position covering the front exposure of the frame 10 as shown in FIG. 1. The enclosures may be held in closed position by means of latch members 56 and **56*a***.

A handle 58 is provided on the horizontal frame member 22 so that the case may be easily carried when the base tray and enclosures are in their storage positions. Thus, in the storage position, the record player mechanism housed in the tray is in a vertical position and is covered by the front face of the loudspeaker enclosures, thereby affording protection to the mechanism and giving the entire package a compact suitcase like appearance.

To place the phonograph into operation the loudspeaker enclosures 12 and 14 are, pivoted outwardly on their respective hinges 48 and 50 to extend adjacent to the left and right side frame members 18 and 20. The tray 16 is rotated from a vertical storage position to a horizontal playing position by releasing the latching member 46.

Figure 4:
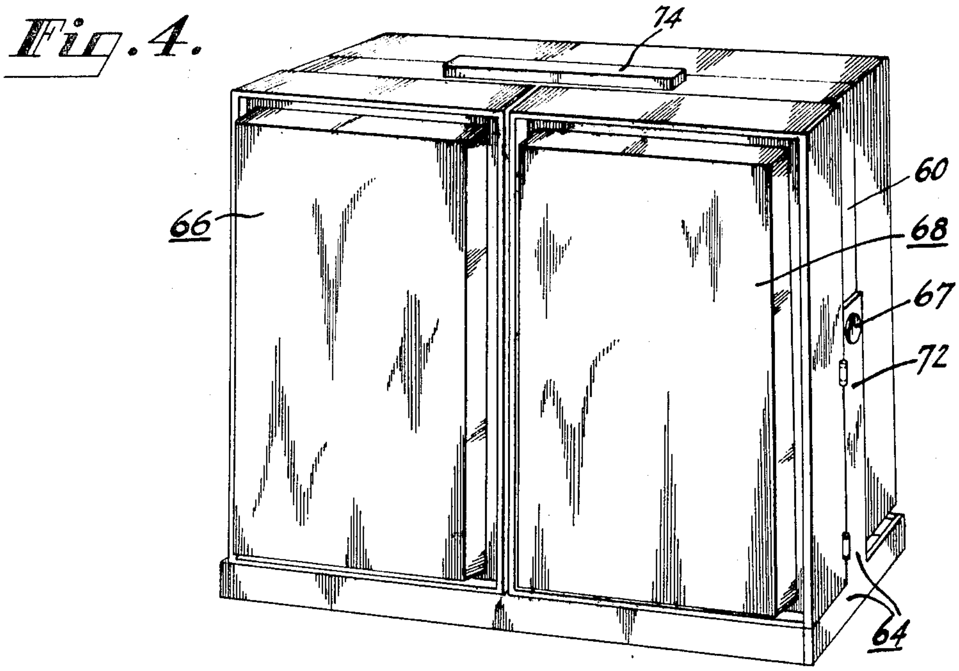
FIG. 4 is a front perspective view of a portable phonograph in accordance with another embodiment of the invention in its closed position.
Figure 5:
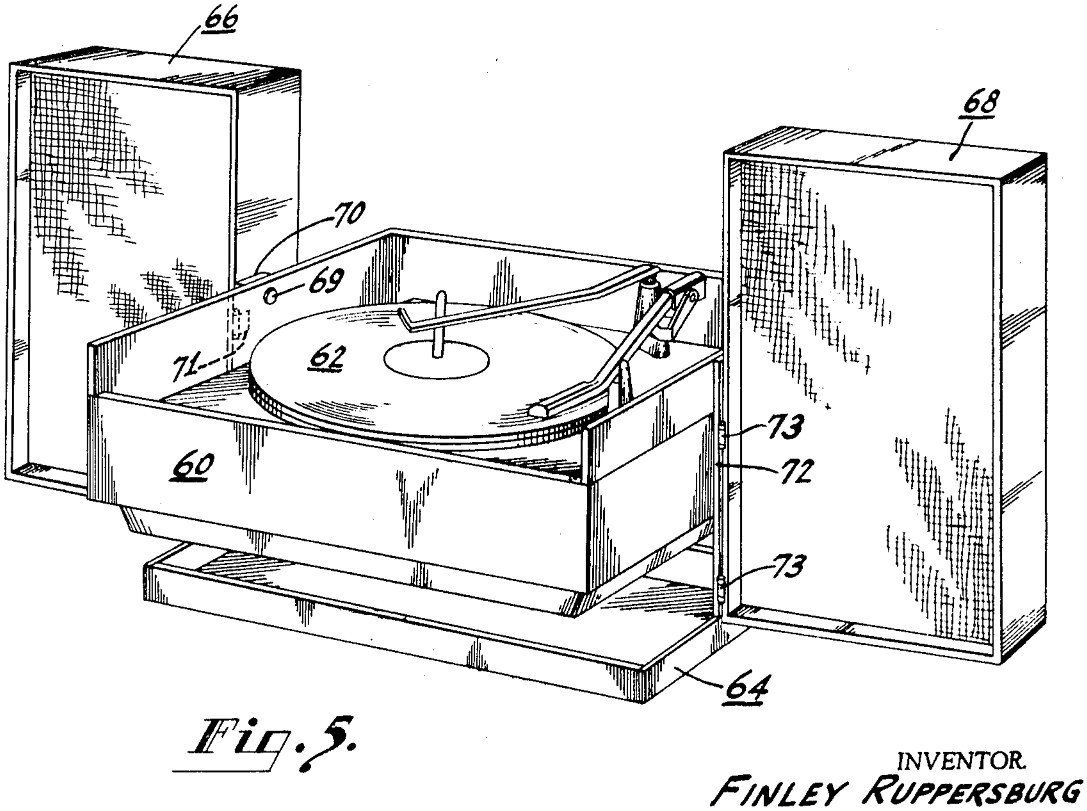
FIG. 5 is a perspective view of the portable phonograph of FIG. 4 shown in its operating position.

FIGS. 4 and 5 illustrate another embodiment of a portable phonograph embodying the invention, in the storage and operating positions respectively. A tray 60 housing the record player apparatus 62 is pivotally mounted to the vertical side member portions of a U-shaped support frame 64 by hinge pins 67 and 69. The base of the frame 64 comprises a rectangularly shaped pedestal or base for supporting the remainder of the apparatus. A pair of loudspeaker enclosures 66 and 68 are hinged to the respective sidewalls 70 and 72 by hinges 71 and 73 respectively.

A handle 74 is attached to one side of the tray 60 so that the phonograph may be easily carried. To operate the instrument, the enclosures are pivoted outward on their hinges to extend adjacent to the left and right sidewall portions of the support frame 64. The tray 60 is rotated from its vertical storage position to a horizontal playing position. In the playing position, the tray is completely exposed on all four sides, providing improved accessibility for operating the record player mounted therein. In its closed position, the loudspeaker enclosures and tray cooperate with each other to provide a casing with a suitcase like appearance.

Figures 6, 7, 8:
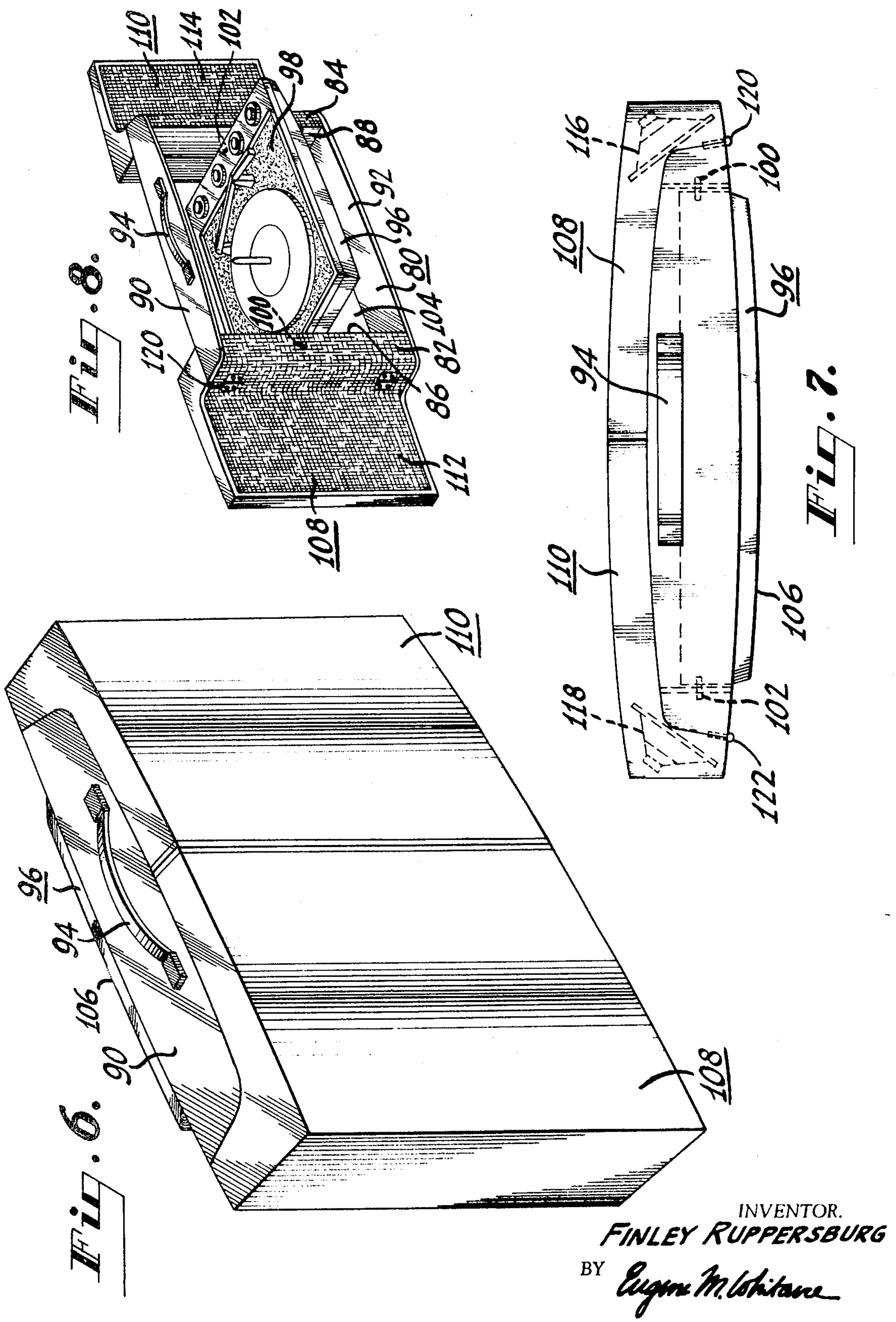
FIG. 6 is a front perspective view of a portable phonograph in accordance with still another embodiment of the invention in its closed position.
FIG. 7 is a top view of the portable apparatus of FIG. 6.
FIG. 8 is a perspective view of the portable phonograph of FIG. 6 shown in its operating position.

FIGS. 6, 7 and 8 illustrate still another embodiment of a portable phonograph embodying the invention.

With reference particularly to FIG. 8, it will be seen that a rectangular frame 80 is provided with externally curved side members 82 and 84, each having a flat inner portion 86 and 88. The frame 60 also includes top and bottom members 90 and 92 and may have a carrying handle 94 attached to its top member 90.

A tray member 96 for housing a record player apparatus 98 is pivotally coupled to the flat sides 86 and 88 of side members 82 and 84 by means of hinge pins 100 and 102 (FIG. 7). The tray 96 containing the record player apparatus 98 is rotatable between an operating position in which the tray extends horizontally through the opening 104 defined by the rectangular frame 80 (FIG. 8) and a vertical storage position in which the bottom 106 of the tray 96 covers the rear exposure of the frame opening 104 (FIG. 7).

A pair of enclosures 108 and 110 are each pivotally hinged to respective sidewall members 82 and 84 for movement between an open position flanking the sidewall members 82 and 84 (FIG. 8), and a closed position covering the front exposure of the frame opening 104 (FIG. 6). It will be seen that the respective front sides 112 and 114 of enclosures 108 and 110 are each inwardly curved to provide a concave frontal area which mates with the front contour of the frame when the enclosures are in their closed position. As shown in FIG. 7, suitable loudspeaker apparatus 116 and 118 may be positioned within the respective enclosures 108 and 110.

In accordance with a feature of the invention, to enclose the phonograph within its self contained carrying case, first the tray member 96 is vertically rotated about its pivot hinges 100 and 102 from its horizontal position to a vertical position in which the bottom 106 of the tray 96 acts as a back member covering for the rear exposure of the frame, and then the laterally flanking enclosures are horizontally pivoted about their pivot hinges 120 and 122 in toward the front exposure of the frame, whereby the enclosures 108 and 110 cover the front exposure of the frame to provide a compact suitcaselike package.

From the foregoing description it will be seen that the casing for portable sound-reproducing apparatus embodying the invention is comprised of the operational components thereof, such as the loudspeaker enclosures and record player tray, thereby eliminating the necessity for an additional cabinet member as in the case of portable phonographs in the prior art. In addition to economy of construction, advantages are provided with respect to the appearance of the apparatus not only in the closed or storage position, but also in the open or playing position. The ready accessibility of the record reproducing mechanism facilitates the loading of sound record members onto the apparatus.

It will be understood that the record player mechanisms as shown in FIGS. 1—8 can be replaced with other apparatus, such as for example, tape mechanisms, without departing from the scope of the invention.

What is claimed is:

1. A portable carrying case for sound-reproducing apparatus comprising:

a normally upright frame having a pair of spaced side members defining an opening therebetween;

tray means for receiving a record-reproducing mechanism mounted between said side members for movement between a substantially horizontal operating position and a substantially vertical storage position, said tray means in its storage position providing a closed back covering the frame opening defined by said vertical side members;

a pair of enclosures for housing loudspeaker apparatus; and means for mounting said enclosures on said side members for movement between an operating position wherein said enclosures face forwardly of said sound-reproducing apparatus in flanking relation to said tray means, and a storage position wherein said enclosures close toward one another to overlay the record-reproducing mechanism in said tray means, said enclosures in the storage position providing a front covering of the opening defined by said frame side member, whereby in the storage position of said apparatus, the bottom surface of said tray means and the rear surfaces of said loudspeaker enclosures cooperate to enclose said record-reproducing mechanism, and in the operating position of said apparatus the record-reproducing mechanism is exposed to facilitate easy record loading and operation.

2. A portable carrying case for sound-reproducing apparatus comprising:

a normally upright frame having a pair of spaced-apart vertical side members;

tray means for receiving a record-reproducing mechanism mounted between said side members for movement between a substantially horizontal operating position and a substantially vertical storage position;

at least one enclosure for housing a loudspeaker mounted on one of said side members for movement between an operating position wherein said enclosure faces forwardly of said sound-reproducing apparatus in flanking relation to said tray means, and a storage position wherein said enclosure overlays the record-reproducing mechanism in said tray means, in the operating position of said sound-reproducing apparatus, said record-reproducing mechanism is exposed and accessible from both sides of said frame, and in the storage position of said sound-reproducing apparatus, the bottom surface of said tray means and the rear surface of said loudspeaker enclosure cooperate to enclose said sound-reproducing apparatus.

3. A carrying case for sound-reproducing apparatus comprising:

a normally upright frame having a pair of vertical side members spaced apart by a horizontal top member;

tray means having a bottom surface and walls extending therefrom forming a box-shaped structure for receiving a record-reproducing mechanism;

means mounting said tray means between said side members for movement between a substantially horizontal operating position and a substantially vertical storage position in which the bottom surface of said tray means provides a closed back cover for said frame;

a pair of enclosures for housing loudspeaker apparatus; and means for mounting said enclosures on said side members for movement between an operating position wherein said enclosures face forwardly of said sound-reproducing apparatus in flanking relation to said tray means, and a storage position wherein said enclosures close toward one another to overlay the record-reproducing mechanism in said tray means providing a closed front covering of said frame, whereby in the storage position of said sound-reproducing apparatus, the bottom surface of said tray means and the rear surface of said loudspeaker enclosures cooperate to provide an enclosed portable casing for said record-reproducing mechanism, and in the operating position of said sound-reproducing apparatus, the record-reproducing mechanism is exposed to facilitate easy record loading and operation.

4. A portable carrying case for sound-reproducing apparatus according to claim 3 including:

pedestal means attached to the bottom surface of said side members for supporting said carrying case;

a first latching means cooperatively positioned on said enclosure and frame for holding said enclosures in its storage position; and second latching means cooperatively positioned on said tray means and frame for holding said tray means in its storage position.

5. A carrying case for housing a phonograph comprising:

a normally upright frame having a pair of spaced vertical side members;

a pair of enclosures for housing loudspeaker apparatus;

tray means for receiving a record-reproducing mechanism;

means for mounting said tray means between said frame side members for movement between, (1) a substantially horizontal position wherein said record-reproducing mechanism is accessible from either side of said side members for inserting or withdrawing records for reproduction by said mechanism, and (2) a substantially vertical storage position wherein the bottom of said tray means forms one wall of said carrying case; and means for respectively mounting said enclosures on said side members for pivotal movement between an operating position wherein the enclosures extend in flanking relation to said tray means and received record-reproducing mechanism so that sound will be radiated forwardly, and a storage position covering the received record-reproducing mechanism wherein the rear surfaces of said enclosures form another wall of said carrying case, said enclosure and said tray means in the storage position thereof cooperating to enclose said received record-reproducing mechanism.

6. A portable carrying case for sound-reproducing apparatus comprising:

a normally upright frame having a pair of vertical side members spaced apart by a horizontal top member;

a tray having a rectangularly shaped bottom surface and four walls extending therefrom forming a box-shaped structure, said tray being adapted for receiving a record-reproducing mechanism;

means for mounting said tray between said side members for movement between a substantially horizontal open position extending through said frame and a vertical closed storage position, the bottom surface of said tray in its storage position providing a closed back member for said carrying case;

a pair of enclosures for receiving loudspeaker apparatus, each of said enclosures having a closed rear surface; and means for mounting said enclosures on said side members for movement between an open position wherein said enclosures face forwardly of said sound-reproducing apparatus in flanking relation to said tray and a closed storage position wherein said enclosures close toward one another to overlay the record-reproducing mechanism received in said tray and provide a closed front member for said carrying case, whereby in the closed position of said tray and enclosures, the bottom surface of said tray and the rear surface of said enclosures cooperate to enclose said record-reproducing mechanism, and in the operating portion of said tray and enclosures, said record-reproducing mechanism is exposed to facilitate record loading and operation.

7. A portable carrying case for a phonograph comprising:

a normally upright frame having a pair of vertical side members spaced apart by a horizontal top member;

a tray having a bottom surface and walls extending therefrom forming a box-shaped structure adapted to receive a record player and associated amplifier means;

means mounting said tray between said side members for movement between a substantially horizontal operating position extending through said frame and a substantially vertical storage position, the bottom surface of said tray in its storage position providing a closed back member for said carrying case;

a pair of enclosures for receiving loudspeaker apparatus; and hinge means supporting each of said enclosures on respective side members of said frame, said hinge means providing for movement of said enclosures between an operating position wherein the enclosures extend in flanking relation to said tray so that sound will be radiated forwardly, and a storage position wherein the enclosures close toward one another to overlay the received record player in said tray providing a closed front member for said carrying case, whereby in the storage position of said phonograph, the bottom surface of said tray and the rear surfaces of said loudspeaker enclosures cooperate to provide respective rear and front members of said carrying case, and in operating position of said phonograph the record player is exposed to facilitate easy record loading and handling.

8. A portable carrying case for a phonograph according to claim 7 including:

pedestal means attached to the bottom surfaces of said side members for supporting said carrying case;

first latching means cooperatively positioned on said enclosures and frame for holding said enclosures in its storage position; and second latching means cooperatively positioned on said tray and frame for holding said tray in its storage position.

9. A portable carrying case for sound-reproducing apparatus comprising:

a tray having a bottom member and front, rear, and sidewalls defining a space for reception of a record player and its associated amplifier means;

an upright and inverted U-shaped frame;

means for mounting said tray within said U-shaped frame for movement between an enclosed vertical storage position exposing the tray bottom member and providing a closed back cover for said sound reproducing apparatus, and a horizontal operating position extending through said frame;

a pair of enclosures adapted to receive loudspeaker apparatus; and means for mounting said enclosures on said frame for movement between an operating position wherein said enclosure faces forwardly of said sound-reproducing apparatus in flanking relation to said tray and a closed storage position wherein said enclosures close toward one another to overlay the record player and amplifier means received in said tray providing a closed front cover for said sound-reproducing apparatus, whereby in the closed position of said sound-reproducing apparatus, the bottom surface of said tray and the rear surfaces of said loudspeaker enclosures cooperate to provide respective rear and front members of said carrying case, and in the operating position of said sound-reproducing apparatus, said record player is exposed to facilitate easy record loading and operation.

10. A carrying case comprising:
a normally upright frame having a pair of vertical side members spaced apart by a horizontal top member;
a tray having rectangularly spaced bottom surfaces and four walls extending therefrom forming a box-shaped structure;
means for mounting said tray between said side members for movement between a substantially horizontal open position extending through said frame and a vertically closed storage position, the bottom surface of said tray in its storage position providing a closed back member portion of said carrying case;
a pair of enclosures, each having a closed rear surface; and
means for mounting said enclosures on said side members for movement between an open position wherein said enclosures face forwardly of said carrying case in flanking relation to said tray and a closed storage position wherein said enclosures close toward one another to overlay the top exposure of said tray in its vertical storage position providing a closed front member portion of said carrying case,
whereby in the closed position of said tray and enclosures, the bottom surface of said tray and the rear surfaces of said enclosures cooperate to provide an enclosed casing having a suitcaselike appearance.

11. A portable cabinet assembly for sound-reproducing apparatus including in combination, a housing having bottom and sidewalls defining a space receiving the sound-reproducing equipment and controls therefor and having an open front portion for providing access to said controls, a base structure having first and second upwardly extending legs, mounting means pivotally mounting said housing about a horizontal axis between said legs, said housing pivoting about said mounting means between a vertical and horizontal position through an angle of substantially 90°, first and second speaker enclosures, each said speaker enclosure being rotatably mounted to a respective one of said legs in a manner so that the same rotate about a substantially vertical axis, said speaker enclosures being rotatable about their vertical axis with said housing in a vertical position to function as doors to close the open front portion of said housing, and said bottom of said housing combines therewith to form a closed cabinet for storage and transportation.

* * * * *